(12) United States Patent
Waldron et al.

(10) Patent No.: US 11,124,709 B2
(45) Date of Patent: Sep. 21, 2021

(54) SYSTEM AND METHOD FOR LIQUID HYDROCARBON DESULFURIZATION

(71) Applicant: Alternative Petroleum Technologies, Inc., Reno, NV (US)

(72) Inventors: Jack Lawrence Waldron, Reno, NV (US); Kylen J. Smith, Reno, NV (US)

(73) Assignee: Alternative Petroleum Technologies Holdings Corp., Auburn, WA (US)

( * ) Notice: Subject to any disclaimer, the term of this patent is extended or adjusted under 35 U.S.C. 154(b) by 439 days.

(21) Appl. No.: 16/019,441

(22) Filed: Jun. 26, 2018

(65) Prior Publication Data
US 2018/0371333 A1    Dec. 27, 2018

Related U.S. Application Data

(60) Provisional application No. 62/524,816, filed on Jun. 26, 2017.

(51) Int. Cl.
*C10G 25/05* (2006.01)
*B01D 15/36* (2006.01)
*B01D 3/14* (2006.01)
*B01J 31/02* (2006.01)
*B01J 21/12* (2006.01)
*B01J 29/06* (2006.01)

(52) U.S. Cl.
CPC ............... *C10G 25/05* (2013.01); *B01D 3/14* (2013.01); *B01D 15/361* (2013.01); *B01J 31/0248* (2013.01); *B01J 21/12* (2013.01); *B01J 29/06* (2013.01); *B01J 31/0202* (2013.01); *C10G 2300/202* (2013.01)

(58) Field of Classification Search
CPC ........ C10G 27/00; C10G 27/04; C10G 27/06; C10G 27/12; C10G 17/00; C10G 17/02; C10G 17/09; C10G 25/05; C10G 2300/202; B01D 15/361; B01D 3/14; B01J 31/0248; B01J 21/12; B01J 29/06; B01J 31/0202
See application file for complete search history.

(56) References Cited

U.S. PATENT DOCUMENTS

| | | | |
|---|---|---|---|
| 2,482,284 | A | 9/1949 | Michael |
| 4,203,827 | A | 5/1980 | Frame |
| 6,402,940 | B1 | 6/2002 | Rappas |
| 64,028,940 | | 6/2002 | Rappas |
| 6,596,914 | B2 | 7/2003 | Gore et al. |
| 9,441,169 | B2 | 9/2016 | Gargano et al. |
| 2007/0227950 | A1 | 10/2007 | Martinie et al. |
| 2010/0300938 | A1 | 12/2010 | Martinie et al. |
| 2011/0108464 | A1 | 5/2011 | Rankin et al. |
| 2012/0018350 | A1 | 1/2012 | Lin et al. |
| 2012/0055844 | A1 | 3/2012 | Bourane et al. |

(Continued)

FOREIGN PATENT DOCUMENTS

| | | |
|---|---|---|
| RU | 2482162 C1 | 5/2013 |
| WO | 2018170130 A1 | 9/2018 |

*Primary Examiner* — Randy Boyer
*Assistant Examiner* — Juan C Valencia
(74) *Attorney, Agent, or Firm* — The Watson IP Group, PLC; Jovan N. Jovanovic

(57) ABSTRACT

A system for liquid hydrocarbon desulfurization having at least one reaction subsystem including at least one high intensity mixer and a stripping station. Multiple reaction subsystems can be utilized. A method is likewise disclosed for liquid hydrocarbon desulfurization.

16 Claims, 1 Drawing Sheet

(56) References Cited

U.S. PATENT DOCUMENTS

| | | |
|---|---|---|
| 2012/0145599 A1 | 6/2012 | Koseoglu et al. |
| 2012/0152804 A1 | 6/2012 | Koseoglu et al. |
| 2013/0315793 A1 | 11/2013 | Koseoglu et al. |
| 2014/0284251 A1 | 9/2014 | Cheng et al. |
| 2014/0299512 A1* | 10/2014 | Gargano ................ C10G 27/04 208/223 |
| 2015/0232765 A1 | 8/2015 | Basfar et al. |
| 2016/0024399 A1* | 1/2016 | Gargano ................ C10G 27/12 208/231 |

* cited by examiner

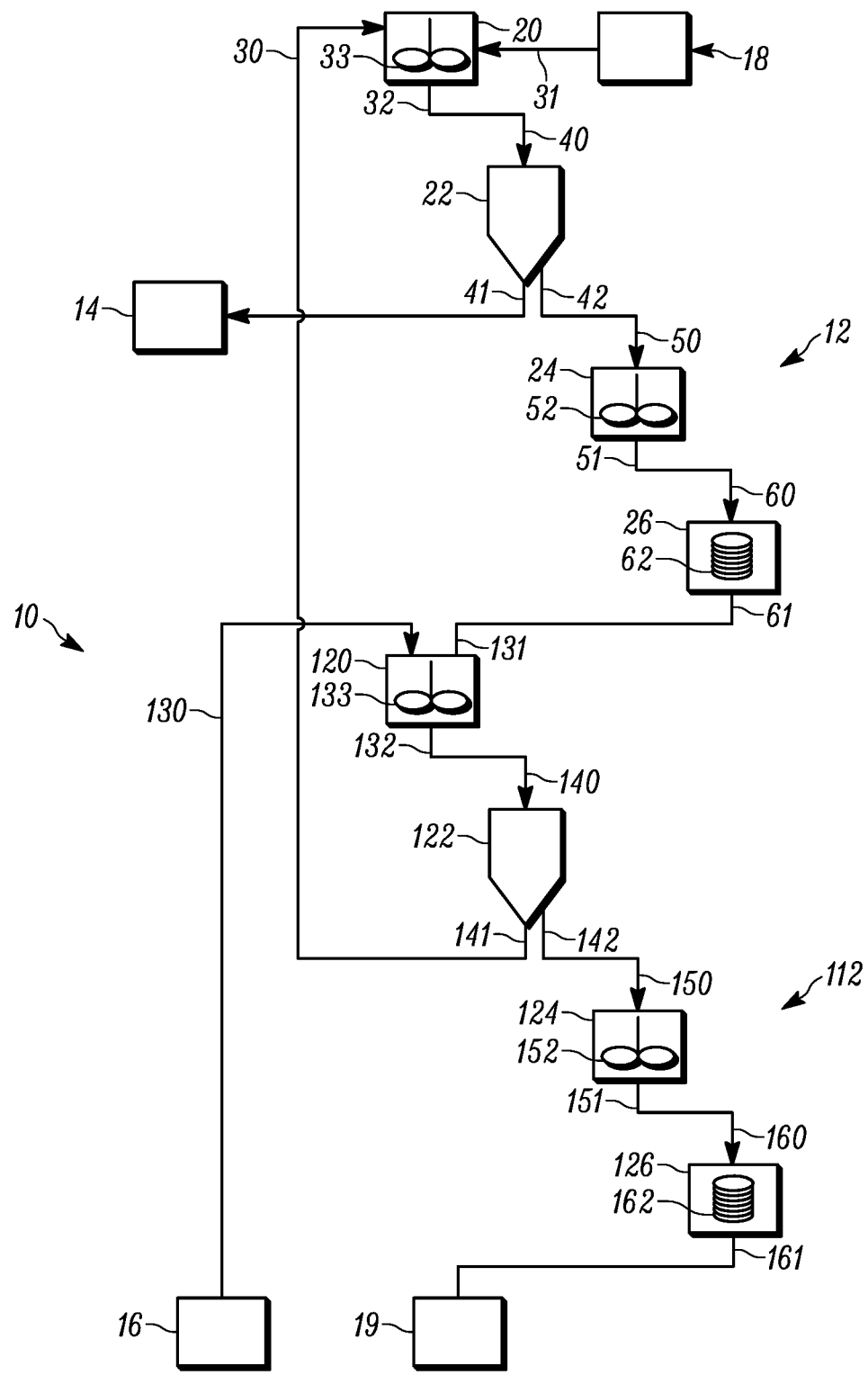

SYSTEM AND METHOD FOR LIQUID HYDROCARBON DESULFURIZATION

CROSS-REFERENCE TO RELATED APPLICATION

This application claims priority from U.S. Pat. App. Ser. No. 62/524,816 filed Jun. 26, 2017, entitled System and Method for Liquid Hydrocarbon Desulfurization, the entire specification of which is hereby incorporated by reference in its entirety.

BACKGROUND OF THE DISCLOSURE

1. Field of the Disclosure

The disclosure relates in general to liquid hydrocarbon desulfurization, and more particularly, to a system and method for the oxidation of sulfur compounds in liquid hydrocarbons.

2. Background Art

Environmental concerns continue to increase with the increased use of hydrocarbon fuels, and have increased considerably with the use of these fuels in areas of the world where environmental regulations may not be as advanced as there are in other global locations.

One pollutant of hydrocarbon fuels is Sulfur, generally found in organic compounds such as thiophenes. Once combusted it becomes oxidized, that, when present in the atmosphere, has several deleterious effects. One of these effects is being a component of acid rain. Traditionally, the sulfur content of liquid hydrocarbons has been reduced by hydro-desulfurization, a process that requires relatively high temperatures and pressures in the presence of hydrogen gas to function economically. However, this technology is relatively costly, time consuming and expensive, which, in turn, limits the ability to rapidly assist countries in reducing Sulfur emissions.

Other methods have been developed for desulfurization. One of which is oxidative desulfurization, and another is bio oxidation. There are also drawbacks with these processes; overall they are promising. Among other drawbacks with oxidative desulfurization, it is difficult to efficiently use the reagents used during the oxidation step. The oxidizer is consumed in the reaction, and is quite costly. While in some systems, the oxidizer can be recycled, it remains difficult. Furthermore, there are operational issues associated with its implementation.

While the prior art is replete with patents directed to oxidative desulfurization, it has remained difficult to develop industrial processes for such innovations. Among other such prior art patents are U.S. Pat. No. 3,163,593 issued to Webster; U.S. Pat. No. 8,574,428 issued to Schucker; U.S. Pat. No. 7,758,745 issued to Cheng; U.S. Pat. No. 7,314,545 issued to Karas; U.S. Pat. No. 7,774,749 issued to Martinie; U.S. Pat. No. 6,596,914 issued to Gore; PCT Pub. No. WO2013/051202 published to Ellis and EP. App. Pub NO. 0482841 issued to Collins. Each of the foregoing patents is incorporated herein in its entirety.

SUMMARY OF THE DISCLOSURE

The disclosure is directed to a system for liquid hydrocarbon desulfurization comprising at least one reaction subsystem including at least one high intensity mixer and a stripping station. A single or multiple reaction subsystems can be utilized. Additionally, the reaction subsystems may be identical or may be different. A number of parameters may be varied, as described below.

The disclosure is likewise directed to a method of liquid hydrocarbon desulfurization comprising the steps of: introducing a hydrocarbon into a reaction subsystem; introducing an aqueous reagent system (often referred to as aqueous) into a reaction subsystem; oxidizing at least some sulfur from the hydrocarbon; stripping the oxidized sulfur from the hydrocarbon.

Additionally, a separating step may be incorporated after the step of introducing the hydrocarbon and the aqueous. The step of oxidizing may occur in a separate retention tank. A number of variations are contemplated. The method may be accomplished through repeated processing in multiple reaction subsystems, which may be substantially identical, or which may be different from each other.

In an aspect of the disclosure, the disclosure is directed to a system for liquid hydrocarbon desulfurization. The system comprises at least one reaction subsystem. The reaction subsystem includes a high intensity mixer and a stripping station. The high intensity mixer has an infeed and an outfeed, and, a mixing agitator. The stripping station includes an infeed, an outfeed and a stripping structure. The outfeed of the high intensity mixer is one of directly and indirectly fluidly coupled to the infeed of the stripping station. The infeed of the high intensity mixer is structurally configured to receive a hydrocarbon fuel and aqueous. The outfeed of the stripping structure is structurally configured to dispense hydrocarbon fuel.

In some configurations, the stripping structure comprises one of a solid and a liquid adsorbent structurally configured to adsorb oxidized sulfur.

In some configurations, the system further comprises a separator. The separator has an infeed, an aqueous outfeed and a hydrocarbon fuel outfeed. The infeed is fluidly coupled to the outfeed of the high intensity mixer and the hydrocarbon fuel outfeed is one of indirectly and directly coupled to the infeed of the stripping station.

In some configurations, the aqueous outfeed is positioned proximate a bottom of the separator with the hydrocarbon fuel outfeed being positioned above the aqueous outfeed.

In some configurations, the system further comprises a retention tank having an infeed and an outfeed. The infeed of the retention tank is fluidly coupled to the hydrocarbon fuel outfeed. The outfeed of the retention tank is fluidly coupled to the infeed of the stripping station.

In some configurations, the retention tank further comprises an agitator therewithin, structurally configured to agitate the hydrocarbon fuel introduced thereinto from the separator.

In some configurations, the at least one reaction subsystem comprises at least two reaction subsystems defining at least a first reaction subsystem and a second reaction subsystem, each having the high intensity mixer and the stripping station.

In some configurations, the second reaction subsystem further includes a separator having an infeed, an aqueous outfeed and a hydrocarbon fuel outfeed. The aqueous outfeed of the separator of the second reaction subsystem fluidly coupled to the infeed of the high intensity mixer of the first reaction subsystem. The outfeed of the stripping station of the first reaction system fluidly coupled to the infeed of the second high intensity mixer.

In some configurations, each of the first and the second reaction subsystems further include a separator having an infeed and an aqueous outfeed and a hydrocarbon outfeed. The aqueous outfeed of the separator of the first reaction subassembly fluidly coupled to the infeed of the high intensity mixer of the second reaction subsystem. The outfeed of the stripping station of the first reaction subsystem fluidly coupled to the infeed of the high intensity mixer of the second reaction subsystem.

In another aspect of the disclosure, the disclosure is directed to a method of liquid hydrocarbon desulfurization comprising the steps of: providing a reaction subsystem; introducing a hydrocarbon fuel into the infeed of the high intensity mixer of a first of the at least one reaction subsystems; introducing aqueous into the infeed of the high intensity mixer of the first of the at least one reaction subsystems; oxidizing at least some sulfur within the hydrocarbon fuel within the high intensity mixer to form oxidized sulfur; directing at least some of the hydrocarbon fuel into the stripping station of the first of the at least one reaction subsystems; and stripping the oxidized sulfur from the hydrocarbon within the stripping station of the first of the at least one reaction subsystems.

In some configurations, the first reaction subsystem further includes a separator. The method further includes the step of separating the aqueous from the hydrocarbon fuel within the separator of the first of the at least one reaction subsystems.

In some configurations, the method further comprises the steps of: providing a second reaction subsystem; coupling the outfeed of the stripping station of the first reaction subsystem to the infeed of the high intensity mixer of the second reaction subsystem; introducing hydrocarbon fuel from the stripping station of the first reaction subsystem to the infeed of the high intensity mixer of the second reaction subsystem; introducing aqueous into the infeed of the high intensity mixer of the second reaction subsystem; oxidizing at least some sulfur within the hydrocarbon fuel within the high intensity mixer of the second reaction subsystem to form oxidized sulfur; directing at least some of the hydrocarbon fuel into the stripping station of the second reaction subsystem; and stripping the oxidized sulfur from the hydrocarbon within the stripping station of the second reaction subsystem.

In some configurations, the first reaction subsystem further includes a separator. In some such configurations, the method further comprising the steps of: separating the aqueous from the hydrocarbon fuel within the separator of the first reaction subsystem prior to the step of directing the hydrocarbon fuel into the stripping station of the first reaction subsystem; separating the aqueous from the hydrocarbon fuel within the separator of the second reaction subsystem; and directing one of: the aqueous from the aqueous outfeed of the separator of the second reaction subsystem to the infeed of the high intensity mixer of the first reaction subsystem, or the aqueous from the aqueous outfeed of the separator of the first reaction subsystem to the infeed of the high intensity mixer of the second reaction subsystem.

In some configurations, the aqueous comprises at least a strong acid and an oxidizer. In some such configurations, the strong acid comprises one of the group consisting of: sulfuric or nitric, hydrofluoric acid, hydrochloric acid, trifluoroacetic acid.

In some configurations, the oxidizer comprises hydrogen peroxide.

In some configurations, the aqueous further comprises an organic acid, which may be selected from the group consisting of: acetic, formic, benzoic, or other acid of the carboxylic family.

In some configurations, the aqueous further comprises a ionic liquid.

In some configurations, the stripping station includes a stripping structure which includes at least one of a solid and a liquid absorbent.

In some configurations, the solid absorbent is selected from the group consisting of: alumina, silica gel, certain clays, zeolites and ion exchange resins.

In some configurations, the liquid absorbent is selected from the group consisting of Acetonitrile, Methanol and liquid ion exchange fluids.

BRIEF DESCRIPTION OF THE DRAWINGS

The disclosure will now be described with reference to the drawings wherein:

FIG. 1 of the drawings is a schematic representation of a system having two reaction subsystems, with the understanding that there may be more than two reaction systems or only a single reaction system in an overall desulfurization system.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the system for liquid hydrocarbon desulfurization is shown generally at 10. The overall system is shown in FIG. 1 as having a pair of reaction subsystems 12 and 112. It will be understood, that the overall system 10 may include a greater or lesser number of reaction subsystems. It will be understood, and explained below, that the system may work in a counter current or co-current manner between the various reaction subsystems. It will also be understood that the construction of each of the reaction subsystems can be varied, and each one of the subsystems need not be identical.

The reaction subsystem 12 is shown schematically in FIG. 1 as comprising high intensity mixer 20, separator 22, retention tank 24 and stripping station 26. The high intensity mixer includes infeed(s) 30, 31 (in the configuration shown), outfeed 32 and mixing agitator 33. The mixing agitator is shown as a mixing paddle, while other configurations are contemplated, such recirculation systems that incorporate shear mixers and the like. One such configuration is shown in U.S. Pat. No. 8,192,073 issued to Waldron et al., the entire specification of which is hereby incorporated by reference.

The separator 22 includes infeed 40, aqueous outfeed 41 and hydrocarbon outfeed 42. It will be understood that the infeed 40 is in fluid communication with outfeed 32 of the high intensity mixer. It will further be understood that, internally, the aqueous outfeed 41 is positioned proximate the lowest point in the tank, with the hydrocarbon outfeed being positioned vertically higher within the tank. The precise positions can be varied depending on the configuration. In addition, there may be a single outfeed from the separator and a subsequent valve that can direct aqueous outfeed in a first direction and hydrocarbon outfeed in another direction. It will be understood that the two will separate due to the effects of gravity.

The retention tank 24 includes infeed 50 and outfeed 51. The retention tank may include relatively mild agitator 52. The infeed 50 of the retention tank 24 is in fluid communication with the outfeed 42 of the separator. Valves, conduit and other such equipment and the like known to one of ordinary skill in the art is omitted for purposes of clarity in the schematic representation.

The stripping station 26 includes infeed 60, outfeed 61, and stripping structure 62. The infeed 60 of the stripping station is in fluid communication with the outfeed 51 of the retention tank 24. It will be understood that within the stripping station, the stripping structures 62 remove, capture and/or retain the oxidized sulfur that has been oxidized through the reactions that occurred in the high intensity mixer, separator and retention tank. It will be understood that the stripping structures can be serviced at desired intervals to insure that they are ready to capture, remove and/or retain oxidized sulfur. The precise period of time, or interval, between servicing can be varied and depends on the particular configuration of the stripping structure and the type of hydrocarbon that is being processed therethrough.

The reaction subsystem 112 is, in the configuration shown, substantially identical to that of the reaction subsystem 12. As such, like components have been identified with the same reference numbers. As indicated above, it will be understood that the reaction subsystem 112 may have components that are different than those in the reaction subsystem 12, and may have different configurations. The disclosure is sufficiently broad to encompass such differences, among others.

The aqueous recovery 14 generally includes an inlet that is in fluid communication with the aqueous outfeed 41 of the initial reaction subsystem 12 in a countercurrent system. The aqueous reactant vessel 16 is in communication with the infeed 30/31 of the high intensity mixer 20 of the initial reaction subsystem 12 in a countercurrent system. The initial hydrocarbon supply tank 18 is in fluid communication with the infeed 30/31 of the high intensity mixer in the countercurrent system (and also in the cocurrent system). The desulfurized hydrocarbon tank 19 is in fluid communication with the outfeed 61 of the stripping station of the final one of the reaction subsystems (reaction subsystem 112 in the configuration shown), in the countercurrent system (and also in the cocurrent system).

In operation, the hydrocarbon fuel is provided to the infeed 31 into the high intensity mixer. Aqueous is also added. In the configuration shown, the aqueous is provided from the separator 122 of the reaction subsystem 112, and, in particular, from the aqueous outfeed 41 thereof. Of course, the supply of aqueous will vary depending on the particular configuration of the system and the subsystems thereof.

The aqueous comprises an organic acid, a peroxide, a strong acid and an ionic liquid, in some configurations. The particular ratios can be varied depending on the particular fuel type and the composition thereof. The organic acid may comprise any one of the following, without limitation, acetic, formic, benzoic, or other acid of the carboxylic family.

The peroxide can be hydrogen peroxide or an organic peroxide, such as meta-chloroperoxybenzoic acid, or a solid oxidizer such as Oxone. In other configurations, compounds can be used in place of the hydrogen peroxide, including, but not limited to co compounds that can produce hydrogen peroxide in aqueous environments, such as super oxides, or oxidants, such as organic peroxides, which ultimately have substantially the same end reactions. Also, other compounds that can support the electron transfer are contemplated. The strong acid can, it is contemplated, be sulfuric or nitric, hydrofluoric acid, hydrochloric acid, trifluoroacetic acid, among others. As will be understood, a strong acid by definition is an acid that is completely disassociated or ionized in a aqueous solution. It is contemplated that the pH of the strong acids is generally less than 2, and preferably less than 1. It may be possible to omit the organic acid in some configurations. The foregoing are not exhaustive, but are illustrative examples. The disclosure is not limited to these particular acids. The ionic liquid, where necessary, may comprise, among other compounds and the like, 1-ethyl-3-methylimidazolium ethyl sulfate.

It is contemplated that the reagent dosage may be preferably 0.1 to 3 moles oxidizer per mole sulfur, preferably 0.1 to 3 moles acid catalyst (as a single acid or blends of acids) per mole sulfur, and preferably 0.1 to 3 moles ionic liquid per mole sulfur. More preferably, the reagent dosages may be preferably 0.5 to 1 mole oxidizer per mole of sulfur and 0.5 to 1 moles acid catalyst per mole sulfur. It is contemplated that the ionic liquid may be zero. And it is also contemplated that the oxidizer and/or the acid catalyst may be below 0.1 and above 3 in each of the ranges above.

Once in the high intensity mixer the aqueous and hydrocarbon fuel are contacted. The oxidizer is combined with the strong acid and the ionic liquid prior to addition. The organic acid can be added individually. It will be understood that in some configurations, an ionic liquid may be omitted. The contact time in the high intensity mixer may be short (i.e., measured in seconds) or may be up to ten minutes (or beyond), depending on the constituents as well as the intensity of the mixing. Through testing, it has been determined that sufficient acid and oxidizer are passed into the hydrocarbon that the reaction in the later retention tank will continue until equilibrium is reached. It will be understood that in this step as well as throughout the method steps, the hydrocarbon fuel may be at a desired temperature to achieve the desired viscosity (i.e., flow within the system), as well as to achieve the desired reaction temperature for the hydrocarbon fuel. Additionally, the temperature may be varied to initiate separation (which in some instances may be cooling or the like.

Once the mixture has been in the high intensity mixer for a desired amount of time, the mixture is directed through outfeed 32 and to infeed 40 of the separator. Once in the separator, the aqueous is removed through the aqueous outfeed 41. The use of the this aqueous will depend on the path of the aqueous through the system. In the configuration shown, the aqueous is directed to the aqueous recovery 14. It may be sent to a subsequent subsystem or a prior subsystem depending on the particular manner that the system is setup.

The hydrocarbon is directed through the hydrocarbon outfeed 42 and into the infeed 50 of the retention tank 24. Once in the retention tank 24, the hydrocarbon is retained for a residence time sufficient to reach equilibrium or to substantially reach equilibrium (of course, the residence time may be greater or less than the time necessary to reach equilibrium). Typically, such residence time is between 10 and 30 minutes. In some configurations, an agitator 52 may be provided to insure thorough intermixing, and to minimize the possibility of locations within the hydrocarbon which are a low acid or oxidizer concentration.

Once in the retention tank for the desired amount of time, the hydrocarbon is directed out of outfeed 51 into the infeed 60 and into the stripping station 26. In the stripping station 26, the oxidized sulfur is stripped from the hydrocarbon through one or both of a solid or liquid absorbent.

Once the oxidized sulfur is stripped from the hydrocarbon, in the configuration shown, the hydrocarbon is directed through outfeed 61 to infeed 131 of the high intensity mixer 120. Reactants (i.e., aqueous) is then added through the infeed 130. In the configuration shown, the aqueous comes from a subsequent step, or in this case (as this is the last step), from a aqueous reactant vessel or vessels 16.

The process described with respect to reaction subsystem 12 is essentially repeated in reaction subsystem 112. In particular, the hydrocarbon and the aqueous is mixed within the high intensity mixer 120 for a predetermined period of time. Once the sufficient time is reached, the mixture is directed through the outfeed 132 to the infeed 140 of the separator 122.

In the separator 122, the aqueous is separated and directed out of the aqueous outfeed 141 which is then directed, in the configuration shown, to the infeed 30 of the high intensity mixer 20 of the reaction subsystem 12. Similarly, the hydrocarbon is directed out of the hydrocarbon outfeed 142 and into the infeed 150 of the retention tank 124. The hydrocarbon is maintained within the retention tank 124 for a predetermined period of time, as set forth above. An agitator 152 may be employed to insure that the hydrocarbon remains mixed properly.

Once the hydrocarbon has been in the retention tank for the desired amount of time, the hydrocarbon can be directed out of outfeed 151 into the infeed 160 of the stripping station 126. In the stripping station 126, the oxidized sulfur is stripped from the hydrocarbon by one or both of a solid or a liquid absorbent. Among other solid absorbents, it is contemplated that alumina, silica gel, certain clays, zeolites and ion exchange resins can be utilized. As for the liquid stripping section, the same works by contacting the liquid hydrocarbon with a stripping liquid which then removes the oxidized sulfur. Such liquids include, but are not limited to, Acetonitrile, Methanol and liquid ion exchange fluids.

Once the oxidized sulfur is stripped, the hydrocarbon is directed through outfeed 161 of the stripping station 126 into the clean hydrocarbon tank 19. In the configuration shown, there are two reaction subsystems through which the hydrocarbon is passed. It will be understood that in other configurations, there may only be a single reaction subsystem 12, while in other configurations, there may be in excess of two reaction subsystems.

Additionally, as indicated above, in the configuration, the aqueous is run counter current, that is the while the hydrocarbon proceeds from the reaction subsystem 12 to the reaction subsystem 112, the aqueous proceeds from reaction subsystem 112 to reaction subsystem 12. It will be understood that the system may also proceed in a cocurrent manner, that is the aqueous proceeds in the same direction as the hydrocarbon fuel.

It will also be understood that the system shown may be run continuously, or may be run in batches. Either manner is contemplated and is suitable for the system.

It will further be understood that the acid can be added separately from the oxidizer and can be added step to step if desired or needed.

Preferably, the removal of the oxidized species is done at or prior to equilibrium. Advantageously, by timing the removal of the oxidized species as such, time delays are minimized, not only is reagent consumption reduced by reducing the required dosage, but the system and method allows for the removal of partially oxidized sulfur species which allows for less reagent usage.

It is further contemplated that, where the carboxylic acid and the peroxide levels that are introduced are such that it may be possible to omit the separator 22 of reaction subsystem 12 and the separator 122 of the reaction subsystem 112.

It is contemplated that at the conclusion of each subsystem, the level of sulfur in the hydrocarbon fuel is reduced. Additional reaction subsystems can be added to achieve the desired reduced level of sulfur content within the hydrocarbon fuel. For example, such a system can be utilized to reduce the sulfur content to less than 20 ppm, and more preferably below 15 ppm, and more preferably below 10 ppm, and more preferably below 5 ppm.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system for liquid hydrocarbon desulfurization comprising:
    at least one reaction subsystem including
        a high intensity mixer, the mixer having an infeed and an outfeed, and, a mixing agitator; and
        a stripping station, the stripping station including an infeed, an outfeed and a stripping structure,
    a separator having an infeed, an aqueous outfeed and a hydrocarbon fuel outfeed; and
    a retention tank having an infeed and an outfeed, wherein the infeed of the retention tank is fluidly coupled to the hydrocarbon fuel outfeed, and wherein the outfeed of the retention tank is fluidly coupled to the infeed of the stripping station;
    wherein the outfeed of the high intensity mixer is one of directly and indirectly fluidly coupled to the infeed of the stripping station;
    wherein the infeed of the high intensity mixer is structurally configured to receive a hydrocarbon fuel and aqueous, and wherein the outfeed of the stripping structure is structurally configured to dispense hydrocarbon fuel;
    wherein the infeed is fluidly coupled to the outfeed of the high intensity mixer and the hydrocarbon fuel outfeed is one of indirectly and directly coupled to the infeed of the stripping station; and
    wherein the retention tank further comprises an agitator therewithin, structurally configured to agitate the hydrocarbon fuel introduced thereinto from the separator.

2. The system for liquid hydrocarbon desulfurization of claim 1 wherein the stripping structure comprises one of a solid and a liquid adsorbent structurally configured to adsorb oxidized sulfur.

3. The system for liquid hydrocarbon desulfurization of claim 1 wherein the aqueous outfeed is positioned proximate a bottom of the separator with the hydrocarbon fuel outfeed being positioned above the aqueous outfeed.

4. A system for liquid hydrocarbon desulfurization comprising:
at least one reaction subsystem including
a high intensity mixer, the mixer having an infeed and an outfeed, and, a mixing agitator; and
a stripping station, the stripping station including an infeed, an outfeed and a stripping structure,
wherein the outfeed of the high intensity mixer is one of directly and indirectly fluidly coupled to the infeed of the stripping station;
wherein the infeed of the high intensity mixer is structurally configured to receive a hydrocarbon fuel and aqueous, and wherein the outfeed of the stripping structure is structurally configured to dispense hydrocarbon fuel;
wherein the at least one reaction subsystem comprises at least two reaction subsystems defining at least a first reaction subsystem and a second reaction subsystem, each having the high intensity mixer and the stripping station; and
wherein the second reaction subsystem further includes a separator having an infeed, an aqueous outfeed and a hydrocarbon fuel outfeed, the aqueous outfeed of the separator of the second reaction subsystem fluidly coupled to the infeed of the high intensity mixer of the first reaction subsystem, and, the outfeed of the stripping station of the first reaction system fluidly coupled to the infeed of the second high intensity mixer.

5. A system for liquid hydrocarbon desulfurization comprising:
at least one reaction subsystem including
a high intensity mixer, the mixer having an infeed and an outfeed, and, a mixing agitator; and
a stripping station, the stripping station including an infeed, an outfeed and a stripping structure,
wherein the outfeed of the high intensity mixer is one of directly and indirectly fluidly coupled to the infeed of the stripping station;
wherein the infeed of the high intensity mixer is structurally configured to receive a hydrocarbon fuel and aqueous, and wherein the outfeed of the stripping structure is structurally configured to dispense hydrocarbon fuel;
wherein the at least one reaction subsystem comprises at least two reaction subsystems defining at least a first reaction subsystem and a second reaction subsystem, each having the high intensity mixer and the stripping station; and
wherein each of the first and the second reaction subsystems further include a separator having an infeed and an aqueous outfeed and a hydrocarbon outfeed, the aqueous outfeed of the separator of the first reaction subassembly fluidly coupled to the infeed of the high intensity mixer of the second reaction subsystem, with the outfeed of the stripping station of the first reaction subsystem fluidly coupled to the infeed of the high intensity mixer of the second reaction subsystem.

6. A method of liquid hydrocarbon desulfurization comprising the steps of:
providing a reaction subsystem including
a high intensity mixer, the mixer having an infeed and an outfeed, and, a mixing agitator; and
a stripping station, the stripping station including an infeed, an outfeed and a stripping structure,
wherein the outfeed of the high intensity mixer is one of directly and indirectly fluidly coupled to the infeed of the stripping station, and
wherein the infeed of the high intensity mixer is structurally configured to receive a hydrocarbon fuel and aqueous, and wherein the outfeed of the stripping structure is structurally configured to dispense hydrocarbon fuel;
introducing a hydrocarbon fuel into the infeed of the high intensity mixer of a first of the at least one reaction subsystems;
introducing aqueous into the infeed of the high intensity mixer of the first of the at least one reaction subsystems;
oxidizing at least some sulfur within the hydrocarbon fuel within the high intensity mixer to form oxidized sulfur;
directing at least some of the hydrocarbon fuel into the stripping station of the first of the at least one reaction subsystems; and
stripping the oxidized sulfur from the hydrocarbon within the stripping station of the first of the at least one reaction subsystems.

7. The method of claim 6 wherein the first reaction subsystem further includes a separator, the separator having an infeed, an aqueous outfeed and a hydrocarbon fuel outfeed, the infeed fluidly coupled to the outfeed of the high intensity mixer and the hydrocarbon fuel outfeed fluidly coupled to the infeed of the stripping station, the method further comprising the step of:
separating the aqueous from the hydrocarbon fuel within the separator of the first of the at least one reaction subsystems.

8. The method of claim 6 further comprising the steps of:
providing a second reaction subsystem, the second reaction subsystem having
a high intensity mixer, the mixer having an infeed and an outfeed, and, a mixing agitator; and
a stripping station, the stripping station including an infeed, an outfeed and a stripping structure,
wherein the outfeed of the high intensity mixer is one of directly and indirectly fluidly coupled to the infeed of the stripping station,
wherein the infeed of the high intensity mixer is structurally configured to receive a hydrocarbon fuel and aqueous, and wherein the outfeed of the stripping structure is structurally configured to dispense hydrocarbon fuel,
coupling the outfeed of the stripping station of the first reaction subsystem to the infeed of the high intensity mixer of the second reaction subsystem;
introducing hydrocarbon fuel from the stripping station of the first reaction subsystem to the infeed of the high intensity mixer of the second reaction subsystem;
introducing aqueous into the infeed of the high intensity mixer of the second reaction subsystem;
oxidizing at least some sulfur within the hydrocarbon fuel within the high intensity mixer of the second reaction subsystem to form oxidized sulfur;
directing at least some of the hydrocarbon fuel into the stripping station of the second reaction subsystem; and
stripping the oxidized sulfur from the hydrocarbon within the stripping station of the second reaction subsystem.

9. The method of claim 8 wherein the first reaction subsystem further includes a separator, the separator having an infeed, an aqueous outfeed and a hydrocarbon fuel outfeed, the infeed fluidly coupled to the outfeed of the high intensity mixer and the hydrocarbon fuel outfeed fluidly coupled to the infeed of the stripping station, and wherein the second reaction subsystem further includes a separator the separator having an infeed, an aqueous outfeed and a hydrocarbon fuel outfeed, the infeed fluidly coupled to the outfeed of the high intensity mixer and the hydrocarbon fuel outfeed fluidly coupled to the infeed of the stripping station, the method further comprising the steps of:

separating the aqueous from the hydrocarbon fuel within the separator of the first reaction subsystem prior to the step of directing the hydrocarbon fuel into the stripping station of the first reaction subsystem;

separating the aqueous from the hydrocarbon fuel within the separator of the second reaction subsystem; and directing one of:

the aqueous from the aqueous outfeed of the separator of the second reaction subsystem to the infeed of the high intensity mixer of the first reaction subsystem, or the aqueous from the aqueous outfeed of the separator of the first reaction subsystem to the infeed of the high intensity mixer of the second reaction subsystem.

10. The method of claim 6 wherein the aqueous comprises at least a strong acid and an oxidizer.

11. The method of claim 10 wherein the strong acid comprises one of the group consisting of: sulfuric or nitric, hydrofluoric acid, hydrochloric acid, trifluoroacetic acid.

12. The method of claim 10 wherein the oxidizer comprises hydrogen peroxide.

13. The method of claim 10 wherein the aqueous further comprises an organic acid, which may be selected from the group consisting of: acetic, formic, benzoic, or other acid of the carboxylic family.

14. The method of claim 10 wherein the aqueous further comprises an ionic liquid.

15. The method of claim 6 wherein the stripping station includes a stripping structure which includes at least one of a solid and a liquid absorbent.

16. The method of claim 15 wherein the solid absorbent is selected from the group consisting of: alumina, silica gel, certain clays, zeolites and ion exchange resins and wherein the liquid absorbent is selected from the group consisting of Acetonitrile, Methanol and liquid ion exchange fluids.

\* \* \* \* \*